US011259223B2

(12) United States Patent
Youtz et al.

(10) Patent No.: US 11,259,223 B2
(45) Date of Patent: Feb. 22, 2022

(54) SYSTEMS AND METHODS FOR HANDOVER FOR USER EQUIPMENT THAT SUPPORTS 5G STANDALONE OPERATION

(71) Applicant: Verizon Patent and Licensing Inc., Basking Ridge, NJ (US)

(72) Inventors: Andrew E. Youtz, Princeton, NJ (US); Samirkumar Patel, Middlesex, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/923,528

(22) Filed: Jul. 8, 2020

(65) Prior Publication Data

US 2022/0014984 A1     Jan. 13, 2022

(51) Int. Cl.
*H04W 4/00*        (2018.01)
*H04W 36/00*       (2009.01)
*H04W 16/14*       (2009.01)
*H04W 36/30*       (2009.01)
*H04W 84/12*       (2009.01)

(52) U.S. Cl.
CPC ..... *H04W 36/00837* (2018.08); *H04W 16/14* (2013.01); *H04W 36/30* (2013.01); *H04W 84/12* (2013.01)

(58) Field of Classification Search
None
See application file for complete search history.

(56) References Cited

U.S. PATENT DOCUMENTS

| 11,039,297 B1 * | 6/2021 | Desai ................... H04W 8/183 |
| 2019/0053186 A1 * | 2/2019 | Mueck .............. H04W 36/0016 |
| 2021/0037430 A1 * | 2/2021 | Jin ...................... H04W 68/005 |

* cited by examiner

*Primary Examiner* — Suhail Khan

(57) ABSTRACT

Embodiments described herein provide for the selective connection of a User Equipment ("UE"), that is camped on a Fifth Generation ("5G") network during a Voice over WiFi ("VoWiFi") call, to another network (e.g., a Long-Term Evolution ("LTE") network). In this manner, if the WiFi connection is dropped, the UE may resume the call via the LTE network rather than first handing over to the 5G network.

20 Claims, 9 Drawing Sheets

SYSTEMS AND METHODS FOR HANDOVER FOR USER EQUIPMENT THAT SUPPORTS 5G STANDALONE OPERATION

BACKGROUND

Wireless networks may offer different types of radio access technologies ("RATs"), such as Long-Term Evolution ("LTE"), Fifth Generation ("5G"), or other types of RATS. In some networks, the 5G portion of the network (e.g., a 5G network core ("5GC")) may not support voice calls during initial deployment. Such networks may use a "fallback" to other types of networks, such as LTE communications for voice calls, so that the LTE portion of the network (e.g., an Evolved Packet Core ("EPC")) can handle the voice calls.

DETAILED DESCRIPTION OF THE PREFERRED EMBODIMENTS

Figure 1A:
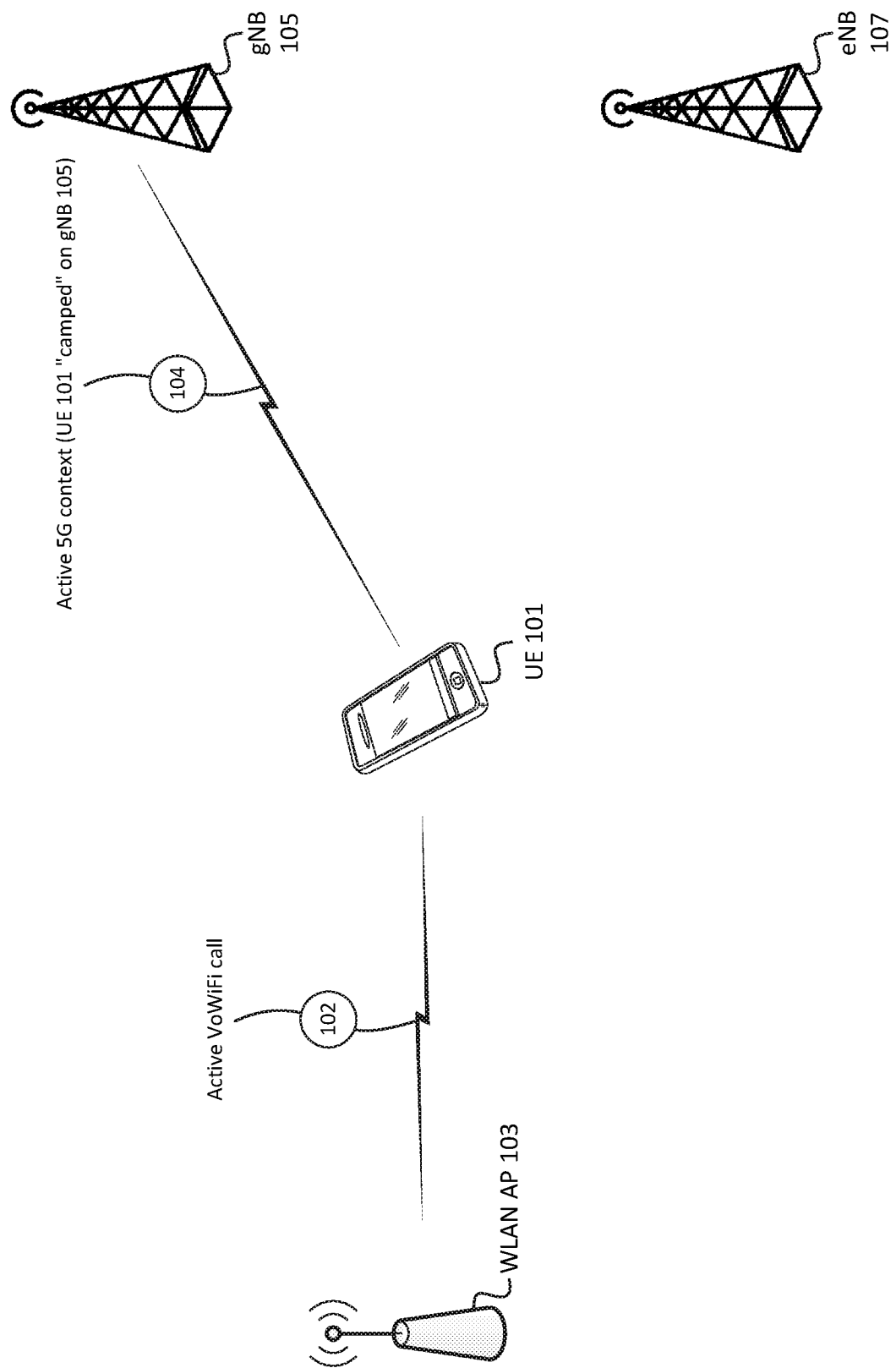
FIGS. 1A and 1B illustrate an example of a UE, that is attached to a 5G network during a Voice over WiFi ("Vo-WiFi") call, attaching to a LTE network such that the VoWiFi.

The following detailed description refers to the accompanying drawings. The same reference numbers in different drawings may identify the same or similar elements.

Some networks that operate according to licensed frequency bands, such as LTE core networks (e.g., an EPC) may support voice call services, while other types of networks that operate according to licensed frequency bands, such as 5G core networks (e.g., a 5GC) may not initially support voice call services. Other types of networks, such as networks that operate according to unlicensed frequency bands (e.g., WiFi networks) may support voice call services and/or other services by way of serving as a wireless interface between a UE and a Packet Data Network ("PDN"), such as the Internet. As used herein, the term "licensed" may refer to a frequency bands associated with (e.g., implemented by) a network or RAT for which access is controlled by an authoritative entity, such as a governmental agency or other entity. Examples of such types of networks may include LTE networks, 5G networks, Third Generation ("3G") networks, Code Division Multiple Access ("CDMA") networks, or the like. The term "unlicensed" may refer to frequency bands associated with (e.g., implemented by) a network or RAT for which access is not controlled by an authoritative entity in the same manner as the networks or RATs mentioned above, such as a WiFi network.

As used herein, the term "licensed network" may be used to refer to a network that operates according to a set of licensed frequency bands (e.g., implements one or more RATs that include licensed frequency bands), and the term "unlicensed network" may be used to refer to a network that operates according to a set of unlicensed frequency bands (e.g., implements one or more RATs that include unlicensed frequency bands). Similarly, the term "licensed RAT" may refer to a RAT that includes one or more licensed bands, and the term "unlicensed RAT" may refer to a RAT that includes one or more unlicensed bands. In some situations, the terms "licensed RAT" and "unlicensed RAT" may be mutually exclusive. That is, in such situations, a licensed RAT may not include any unlicensed frequencies, and an unlicensed RAT may not include any licensed frequencies.

When connected to a WiFi network, a UE may maintain a context with a licensed wireless network (sometimes referred to as "camping"), such as a LTE radio access network ("RAN"), a 5G RAN, or some other type of RAN. In this manner, if the UE loses connectivity with the WiFi network, the UE can quickly resume communications with the licensed network using the maintained context. UEs that support 5G standalone ("SA") communications may maintain a context with a 5G network, while UEs that do not support 5G SA communications may maintain a context with a LTE network.

When in an active VoWiFi call, a UE that is camped on a 5G network may experience disruptions in the call when losing WiFi connectivity. For example, the context with the 5G network may be activated (e.g., changed from an "idle" mode to an "active" mode), upon which the UE and/or the 5G network may determine that the UE is in an active voice call, and the UE may subsequently scan for and/or attempt to connect to a LTE network (or some other type of network) to carry the voice call. For example, the 5G network may instruct the UE to scan for the LTE network (or some other type of network) in situations where the 5G network does not support voice services. The handover or redirection from the WiFi network to the 5G network and the subsequent handover or redirection from the 5G network to the LTE network may result in audible disruptions in the call and/or may result in the call being dropped.

Embodiments described herein provide for the selective connection of a UE, that is camped on a 5G network during a VoWiFi call, to a LTE network such that if the WiFi connection is dropped, the UE may resume the call via the LTE network rather than first handing over to the 5G network. As shown in FIG. 1A, for example, UE 101 may be engaged (at 102) in an active VoWiFi call via wireless local area network ("WLAN") access point ("AP") 103. WLAN AP 103 may be, or may include, a WiFi router, access point, etc. that provides WiFi connectivity to UE 101. Further, WLAN AP 103 may be communicatively coupled to a core of a wireless network (e.g., a 5GC, an EPC, a hybrid network that includes 5GC and EPC functionality, and/or some other wireless network core), and/or to a network or system that is communicatively coupled to a wireless network core (e.g., an Internet Protocol ("IP") Multimedia Subsystem ("IMS")). In some embodiments, WLAN AP 103 may be communicatively coupled to the wireless network core or other network or system via one or more gateways, such as an evolved Packet Data Gateway ("ePDG").

UE 101 may include a voice client or other functionality that is able to determine the UE's status as being engaged in an active voice call or other type of active communication. In some embodiments, UE 101 may receive information from a wireless network core or other system that provides voice services and/or otherwise handles traffic relating to the call (e.g., an IMS network) indicating that UE 101 is engaged in the active voice call. For example, the IMS network and/or some other device or system may provide information to UE 101 indicating one or more Access Point Names ("APNs"), bearers, or other context information associated with the active call. While discussed herein in the context of a voice call, similar concepts may apply to other types of communications (e.g., content streaming, file transfer, etc.) as appropriate.

As further shown, UE 101 may be "camped" (at 104) on a 5G network. For example, Next Generation Node B ("gNB") 105 may maintain a Radio Resource Control ("RRC") context. Further, other elements of the 5G network (e.g., an Access and Mobility Management Function ("AMF")) may maintain one or more bearers or other context information associated with UE 101. Such context or bearers (e.g., as maintained by gNB 105 and/or an AMF to which gNB 105 is communicatively coupled) may be used by UE 101 in situations where UE 101 supports a 5G SA arrangement (e.g., in which UE 101 supports camping on the 5G network, without requiring a context to be maintained by a LTE network). As noted above, generally speaking, in situations where UE 101 loses connectivity from WLAN AP 103 (e.g., if UE 101 moves away from WLAN AP 103, if WLAN AP 103 loses power, etc.), UE 101 may obtain data connectivity via gNB 105. As also discussed above, however, such handover may cause service disruption in situations where gNB 105 (and/or an associated core network) does not support the type of active communications in which UE 101 is engaged (e.g., voice calls, in the example described here).

Figure 1B:
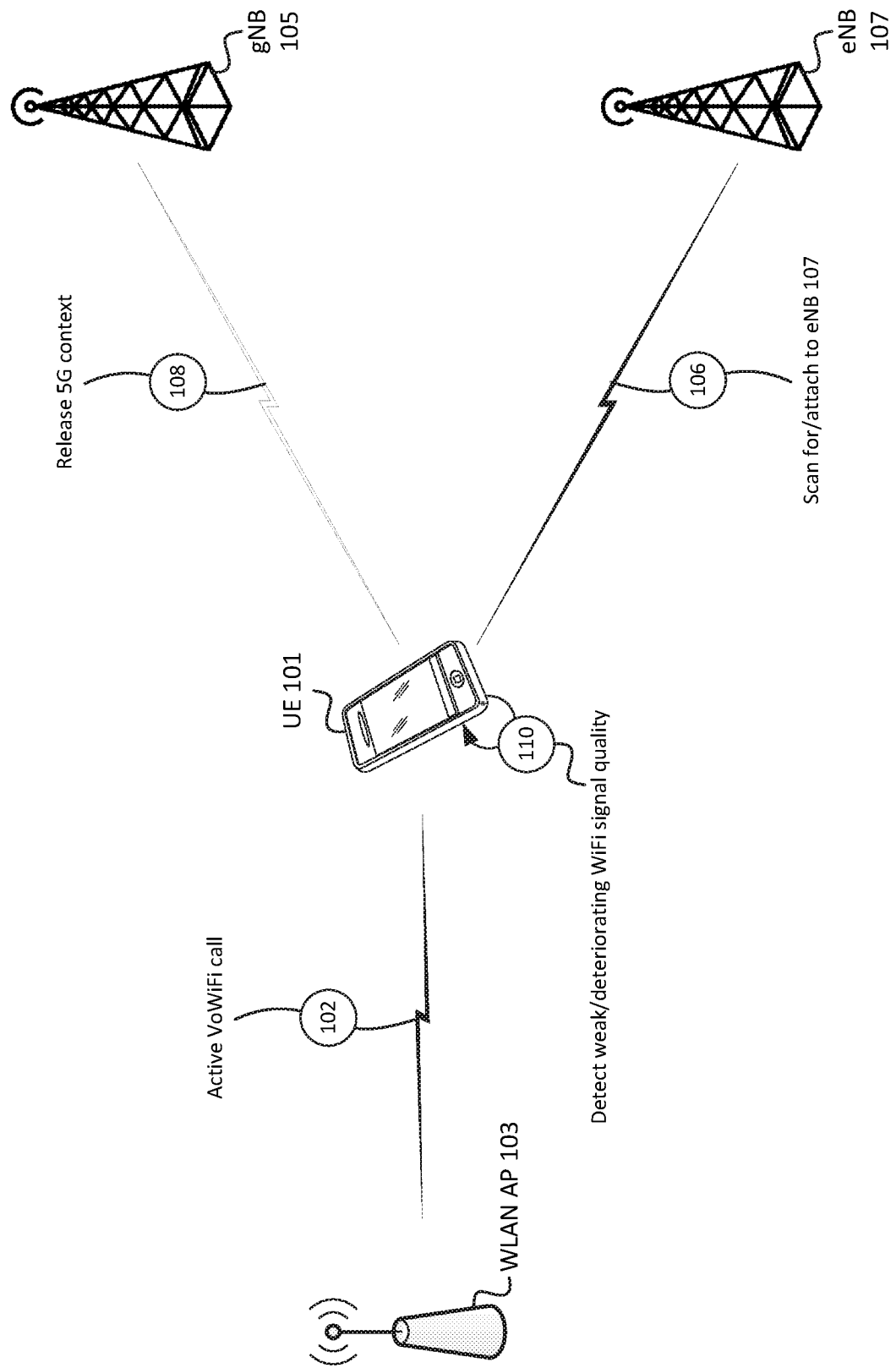

As also shown in FIG. 1A, evolved Node B ("eNB") 107 may be in communication range of UE 101. As shown in FIG. 1B, UE 101 may scan (at 106) fora base station that implements an LTE RAT (and/or some other RAT other than a 5G RAT). For example, UE 101 may scan for such a base station that implements the LTE RAT based on determining that UE 101 is engaged (at 102) in an active VoWiFi call via WLAN AP 103. As mentioned above, UE 101 may scan for the base station that implements the LTE RAT (e.g., a RAT other than 5G) in situations where the 5G RAT does not support voice services (e.g., where gNB 105 is communicatively coupled to a 5GC that does not include voice call functionality).

In some embodiments, UE 101 may utilize one or more particular scanning methodologies to scan for a base station that implements an LTE RAT (e.g., an eNB). For example, UE 101 may scan for frequency bands associated with the LTE RAT in a pre-set order. In some embodiments, the pre-set order may be configured as part of firmware, operating system-level parameters, Universal Integrated Circuit Card ("UICC") parameters, and/or otherwise pre-configured for UE 101. In some embodiments, such pre-set parameters may be received by UE 101 during an initial provisioning process, as part of an over-the-air ("OTA") update procedure, and/or as part of some other process.

In some embodiments, UE 101 may scan for LTE bands based on information provided by gNB 105. For example, gNB 105 may broadcast (e.g., as part of a System Information Block ("SIB") or some other type of broadcast message) information indicating priorities or rankings of LTE bands, based on which UE 101 may scan for an eNB. For example, UE 101 may first scan for an eNB using a highest-ranked band indicated in the SIB and, if UE 101 is unable to detect an eNB that implements the highest-ranked band (and/or is otherwise unable to connect to such an eNB using this band), then UE 101 may scan for an eNB using the next highest-ranked band indicated in the SIB. In some embodiments, gNB 105 may dynamically update or modify the SIB based on channel conditions or congestion detected by gNB 105, UEs connected to gNB 105, and/or one or more other devices or systems that track channel quality or congestion. For example, in some situations, a relatively close eNB to gNB 105 may be relatively congested, in which case gNB 105 may update the SIB to indicate that UEs should scan for another eNB that is relatively farther away from gNB 105, but is relatively less congested.

As yet another example, UE 101 may scan for LTE bands based on bands previously used by UE 101. For example, if UE 101 was previously connected to an eNB via a particular band, UE 101 may scan for eNBs using this particular band first. In some embodiments, a list of previously used LTE bands may be used by UE 101 to scan for eNBs. For example, UE 101 may first scan for eNBs using the last used LTE band and, if UE 101 is unable to detect an eNB that implements the last used band (and/or is otherwise unable to connect to such an eNB using this band), then UE 101 may scan for an eNB using the second-last LTE band that UE 101 used.

In some embodiments, UE 101 may use multiple ones of the scanning methodologies used above, and/or one or more other scanning methodologies in addition to or in lieu of such methodologies. For example, UE 101 may first scan for a last used LTE band, then scan for the second-last used LTE band, then scan for a highest-ranked LTE band indicated in a SIB from gNB 105, and so on. In some embodiments, UE 101 may perform one or more other operations as part of, or in conjunction with, the attachment to eNB 107. For example, UE 101 may output a Tracking Area Update ("TAU") request via eNB 107, which may be used by one or more elements of the LTE RAN or the EPC (e.g., a Mobility Management Entity ("MME")) to locate UE 101.

As a result of the scanning, UE 101 may detect the presence and/or availability of eNB 107, and may perform (at 106) an attachment procedure to connect to eNB 107. For example, UE 101 may exchange one or more RRC and/or Non-Access Stratum ("NAS") messages to establish one or more bearers, a context, or the like at eNB 107. Based on the attachment, UE 101 may be "camped" on eNB 107. As UE 101 is camped on eNB 107, UE 101 may release (at 108) one or more bearers, a context, etc. with gNB 105. For example, UE 101 may output one or more RRC messages or other suitable messages to gNB 105, requesting or instructing gNB 105 to release resources that gNB 105 may have allocated to maintaining the context associated with UE 101.

As further shown in FIG. 1B, UE 101 may detect (at 110) weak and/or deteriorating WiFi signal quality. For example, UE 101 may determine that a Received Signal Strength Indicator ("RSSI") and/or some other measure of signal strength associated with the connection between UE 101 and WLAN AP 103 is below a threshold value, is decreasing at a threshold rate, and/or is otherwise deteriorating. In some embodiments, this detection (at 110) may occur after UE 101 has scanned for and attached (at 106) to eNB 107 and after UE 101 has released (at 108) a context associated with gNB 105. In some embodiments, UE 101 may scan for and attach (at 106) to eNB 107 and release (at 108) the context associated with gNB 105 after, or based on, detecting (at 110) the weak or deteriorating WiFi signal. That is, in some embodiments, UE 101 may remain camped on gNB 105 during the call in situations where the WiFi signal is relatively strong.

Figure 1C:
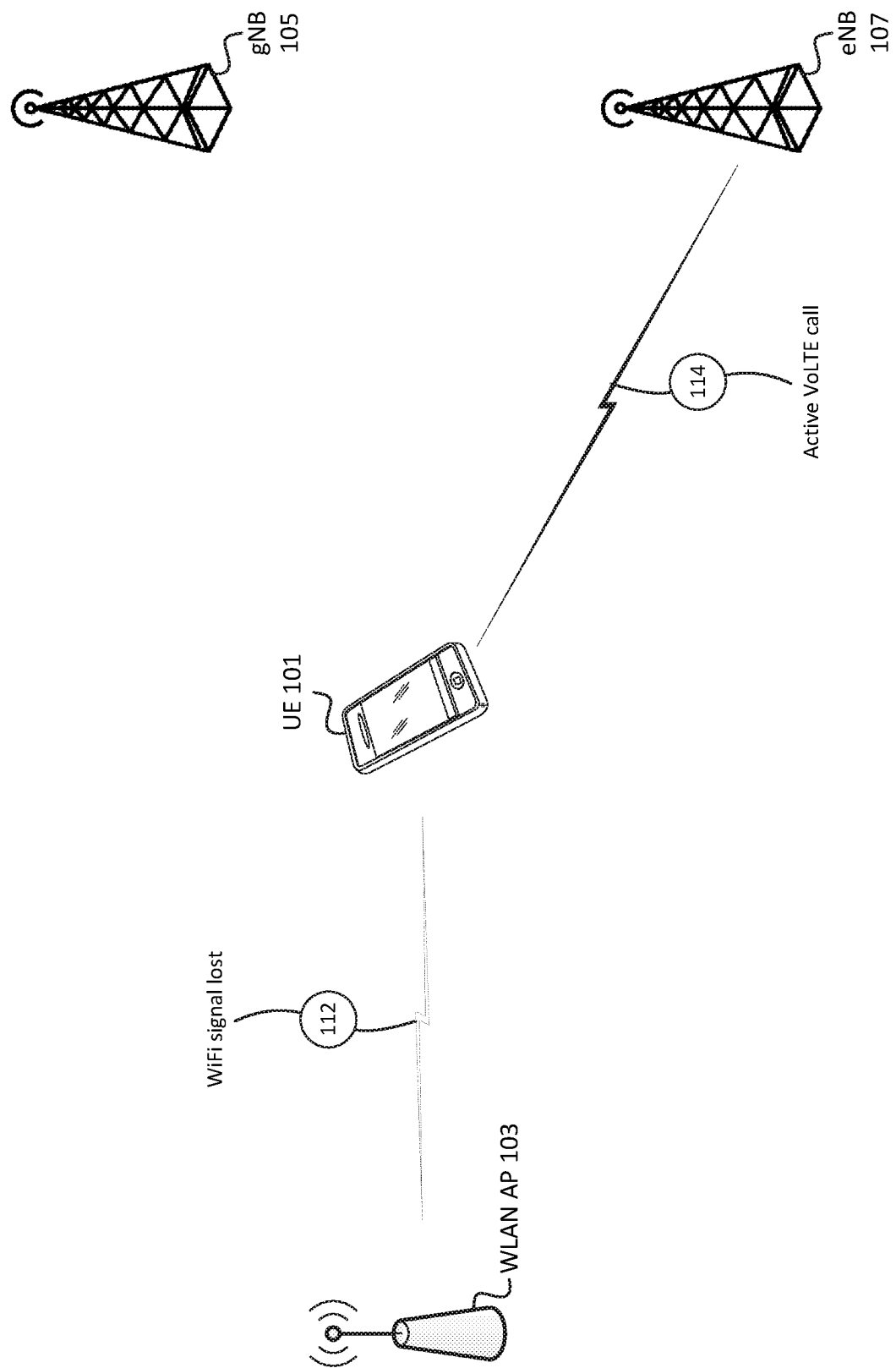
FIG. 1C illustrates an example of the VoWiFi call being handed over to the LTE network based on the attachment to the LTE network.

As shown in FIG. 1C, UE 101 may determine (at 112) that the WiFi signal has been lost. For example, UE 101 may determine that the RSSI or other metric of signal quality between UE 101 and WLAN AP 103 is below a threshold (e.g., where this threshold may be different from the threshold mentioned above with respect to the detection of a weak or deteriorating threshold at 110), that one or more performance metrics (e.g., latency, throughput, jitter, and/or other performance metrics) associated with traffic sent and/or received to and/or from WLAN AP 103 are below a threshold, that WLAN AP 103 is unreachable, and/or that the signal between UE 101 and WLAN AP 103 is otherwise unacceptable or unusable.

Based on determining (at 112) that the WiFi signal has been lost, UE 101 may continue (at 114) the active call via eNB 107. For example, UE 101 and eNB 107 may hand the VoWiFi call, via WLAN AP 103, over to a Voice over LTE ("VoLTE") call via eNB 107. In some embodiments, handing the call over to eNB 107 may include UE 101 outputting one or more messages via eNB 107, such as a Packet Data Network ("PDN") Connectivity Request. In some embodiments, the PDN Connectivity Request may be sent to one or more devices or systems handling the call, such as an IMS network. In some embodiments, the PDN Connectivity Request may include an identifier or indicator that the request is associated with a handover (e.g., PDN Connectivity Request message with a type of "handover"). In some embodiments, UE 101 may register, or re-register, with the IMS network as part of handing the call over from WLAN AP 103 to eNB 107. Once the call has been handed over, the call can be continued with relatively minimal disruption, at least by virtue of the prior establishment of the connection (at 106) of UE 101 to eNB 107.

Figure 1D:
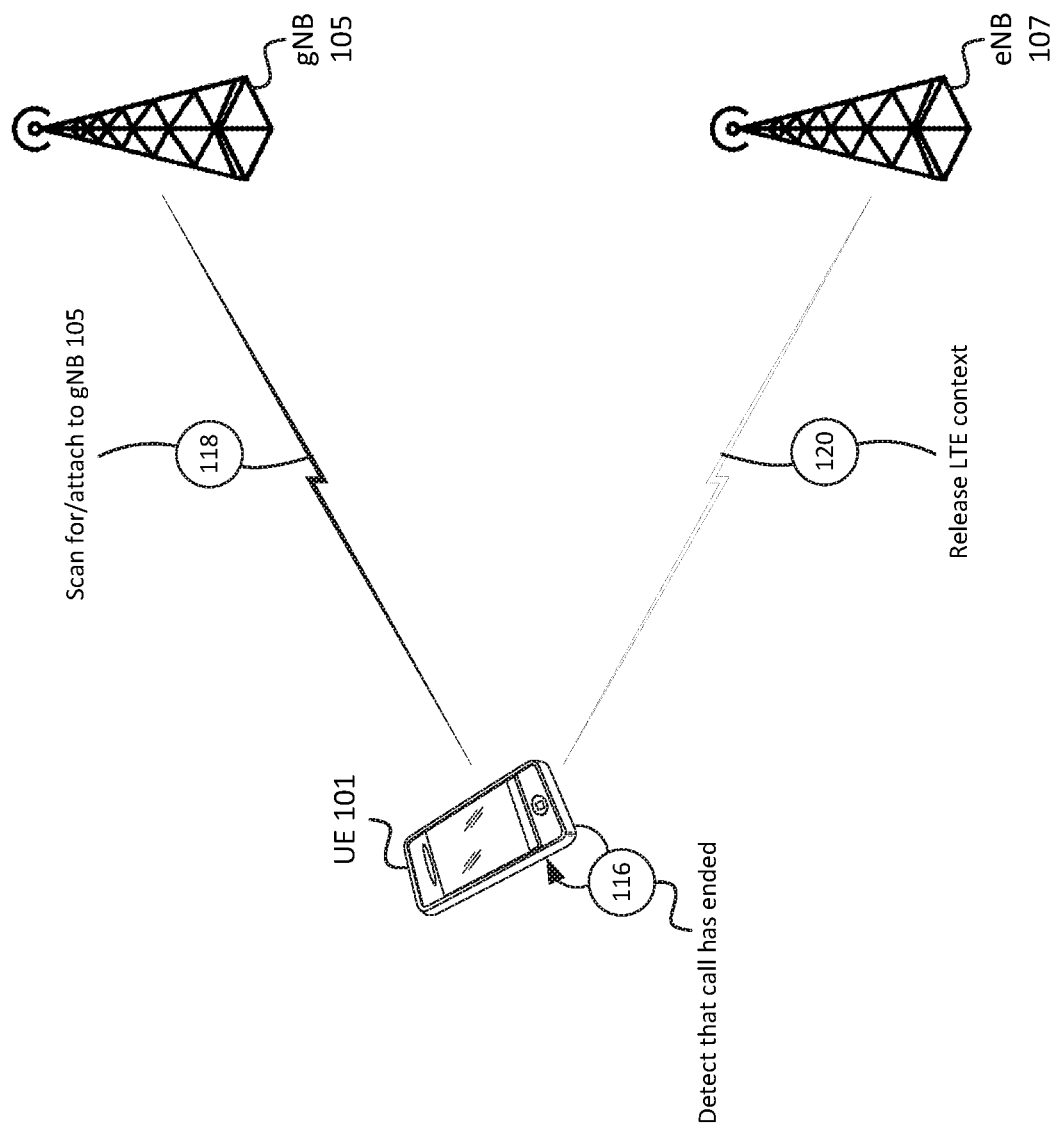
FIG. 1D illustrates an example of the UE attaching to the 5G network after the call ending.

In some embodiments, once the call has ended, UE 101 may reconnect to gNB 105. For example, as shown in FIG. 1D, UE 101 may detect (at 116) that the call has ended. For example, UE 101 may determine that UE 101 was engaged in a VoLTE call via eNB 107, that UE 101 has 5G SA capability (e.g., is able connect to a base station of the 5G network without being anchored to a base station of the LTE network), and further that the VoLTE call has ended. In some embodiments, UE 101 may receive an indication from a device or system that handles the call (e.g., an IMS network) that the call has ended. Additionally, or alternatively, in some embodiments, a voice call application associated with UE 101 may determine that the call has ended.

Based on detecting (at 116) that the call has ended, UE 101 may scan for and attach (at 118) to a base station that implements a 5G RAT. For example, UE 101 may scan for the same gNB 105 to which UE 101 was previously attached, may scan for the same 5G band to which UE 101 was previously attached, and/or may otherwise scan for a base station that implements the 5G RAT. Once UE 101 has attached (at 118) to gNB 105, UE 101 may release (at 120) a context associated with the connection between UE 101 and eNB 107. In this manner, UE 101 may continue to receive services from gNB 105, and/or may be ready to receive future services from gNB 105 without needing to re-register with gNB 105 at the time of service.

Figure 2:
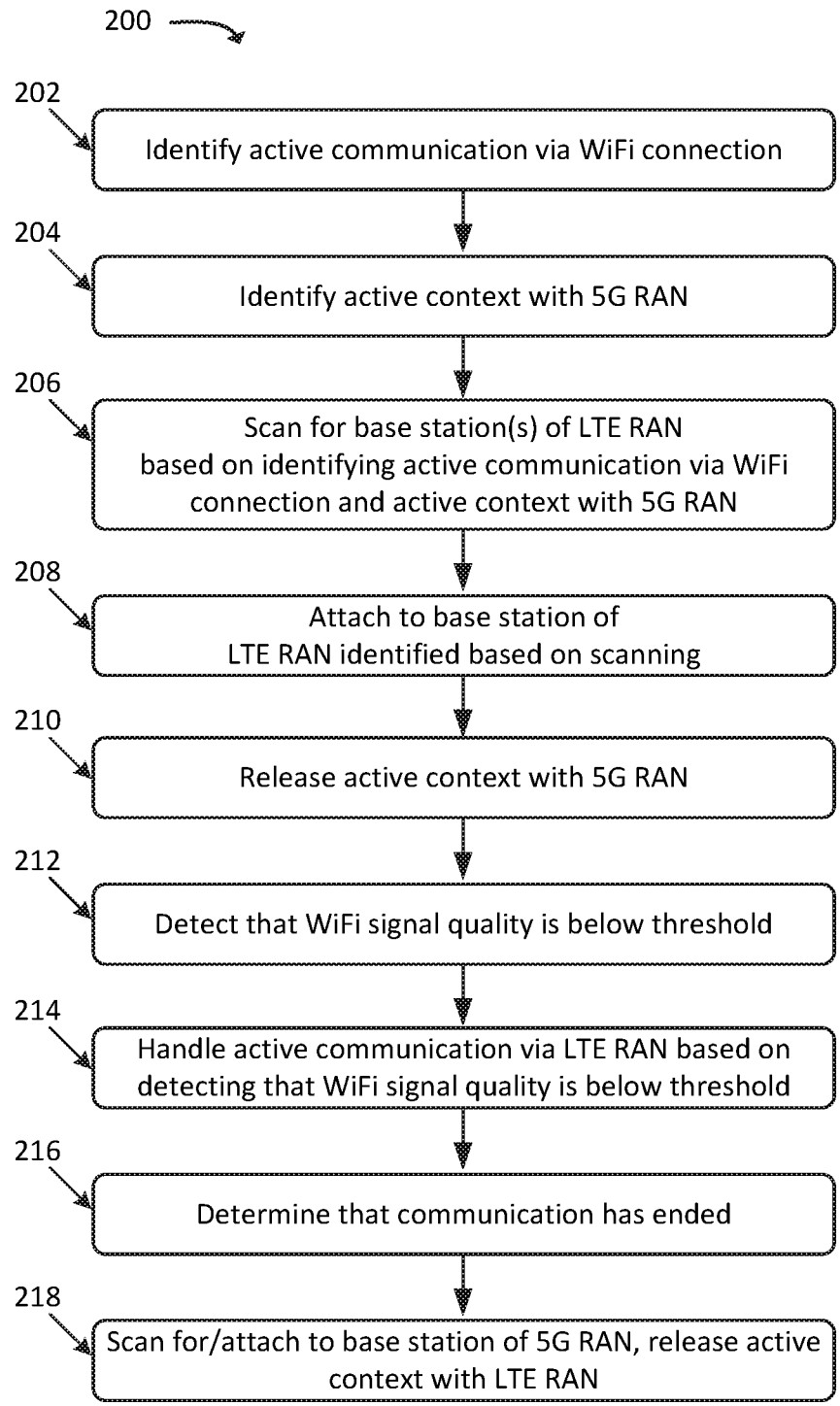
FIG. 2 illustrates an example process for connecting to a wireless network according to a particular RAT for potential handover of a call that is carried over an unlicensed network.

FIG. 2 illustrates an example process 200 for connecting to a wireless network according to a particular RAT (e.g., a RAN that implements a LTE RAT) for potential handover of a call that is carried over an unlicensed network (e.g., a WiFi network). In some embodiments, some or all of process 200 may be performed by UE 101. In some embodiments, one or more other devices may perform some or all of process 200 in concert with, and/or in lieu of, UE 101.

As shown, process 200 may include identifying (at 202) an active communication via a WiFi connection. For example, as discussed above, UE 101 may determine that UE 101 is involved in an active communication, such as an active voice call, via WLAN AP 103 and/or some other device or system that implements a wireless network according to an unlicensed RAT, such as a WiFi RAT. As discussed above, UE 101 may receive one or more messages or other information from an IMS network and/or some other device or system that provides voice call services and/or otherwise handles the active communication, indicating that a status of the call or type of the call is a VoWiFi call.

Process 200 may further include identifying (at 204) an active context with a 5G RAN. For example, UE 101 may determine that UE 101 has an active connection, context, bearer(s), etc. with a particular base station of a 5G RAN (e.g., gNB 105). Based on determining (at 202) that UE 101 is engaged in an active communication session via a WiFi connection, and further based on identifying (at 204) the active 5G context with gNB 105, UE 101 may scan (at 206) for base stations of a LTE RAN (and/or a RAN of some other suitable RAT). For example, as discussed above, UE 101 may scan for LTE base stations based on a pre-set priority list, priorities indicated by gNB 105 (e.g., via a SIB), a list of last used LTE bands, and/or using some other suitable scanning methodology.

Process 200 may also include attaching (at 208) to a particular base station of the LTE RAN based on the scanning. For example, UE 101 may identify a particular eNB 107 based on the scanning, and may perform an RRC connection procedure with eNB 107, send a TAU request to a MME associated with eNB 107, and/or perform one or more other operations to attach to eNB 107. Based on this attachment procedure, UE 101 may be "camped" on eNB 107 via the LTE RAT (or other suitable RAT).

Process 200 may further include releasing (at 210) an active context with the 5G RAN. For example, once UE 101 has attached (at 208) to eNB 107, UE 101 may send an indication, instruction, etc. to gNB 105, indicating that resources allocated by gNB 105 to maintain a context associated with UE 101 should be released.

Process 200 may additionally include detecting (at 212) that WiFi signal quality is below a threshold. For example, UE 101 may determine that a signal quality between UE 101 and WLAN AP 103 (e.g., based on RSSI values, performance metrics, and/or other factors) is below a threshold signal quality. In some embodiments, the scanning (at 206) for base stations of a LTE RAN (or RAN associated with some other RAT) may be performed based on the detection (at 212) of the WiFi signal quality being below the threshold (and/or approaching the threshold). In other words, degrading or degraded WiFi signal quality may be a trigger based on which UE 101 performs (at 206) a scan for base stations of a LTE RAN and/or a RAN associated with some other suitable RAT.

Process 200 may also include handling (at 214) the active communication via the LTE RAN based on detecting that the WiFi signal quality is below the threshold. For example, UE 101 may perform or initiate a handover procedure to handover the call from a VoWiFi call, via WLAN AP 103, to a VoLTE call (or other suitable call type) via eNB 107. For example, as discussed above, UE 101 may output one or more messages to a device or system that provides call services and/or otherwise handles the call (e.g., an ePDG, an IMS network, a RAN, and/or some other device or system), requesting or initiating the handover of the call from WLAN AP 103 to eNB 107.

Process 200 may further include determining (at 216) that the communication has ended. For example, as discussed above, UE 101 may determine at some point that the call has ended. Based on determining that the communication has ended, UE 101 may scan for and attach (at 218) to a base station that implements a 5G RAT. For example, as discussed above, UE 101 may scan for the particular gNB 105 to which UE 101 was previously connected (at 204), may scan using the same band to which UE 101 was connected to gNB 105, and/or may otherwise scan for and attach to a base station that implements the 5G RAT. In some embodiments, the LTE RAN (e.g., eNB 107) may send one or more messages or instructions (e.g., one or more RRC and/or NAS messages) to handover, redirect, and/or otherwise cause UE 101 to scan for and/or connect to a base station of the 5G RAN (e.g., gNB 105 or some other gNB). In this manner, UE 101 may remain connected via a 5G RAT and may receive, or be ready to receive, services via the 5G RAT.

Figure 3:
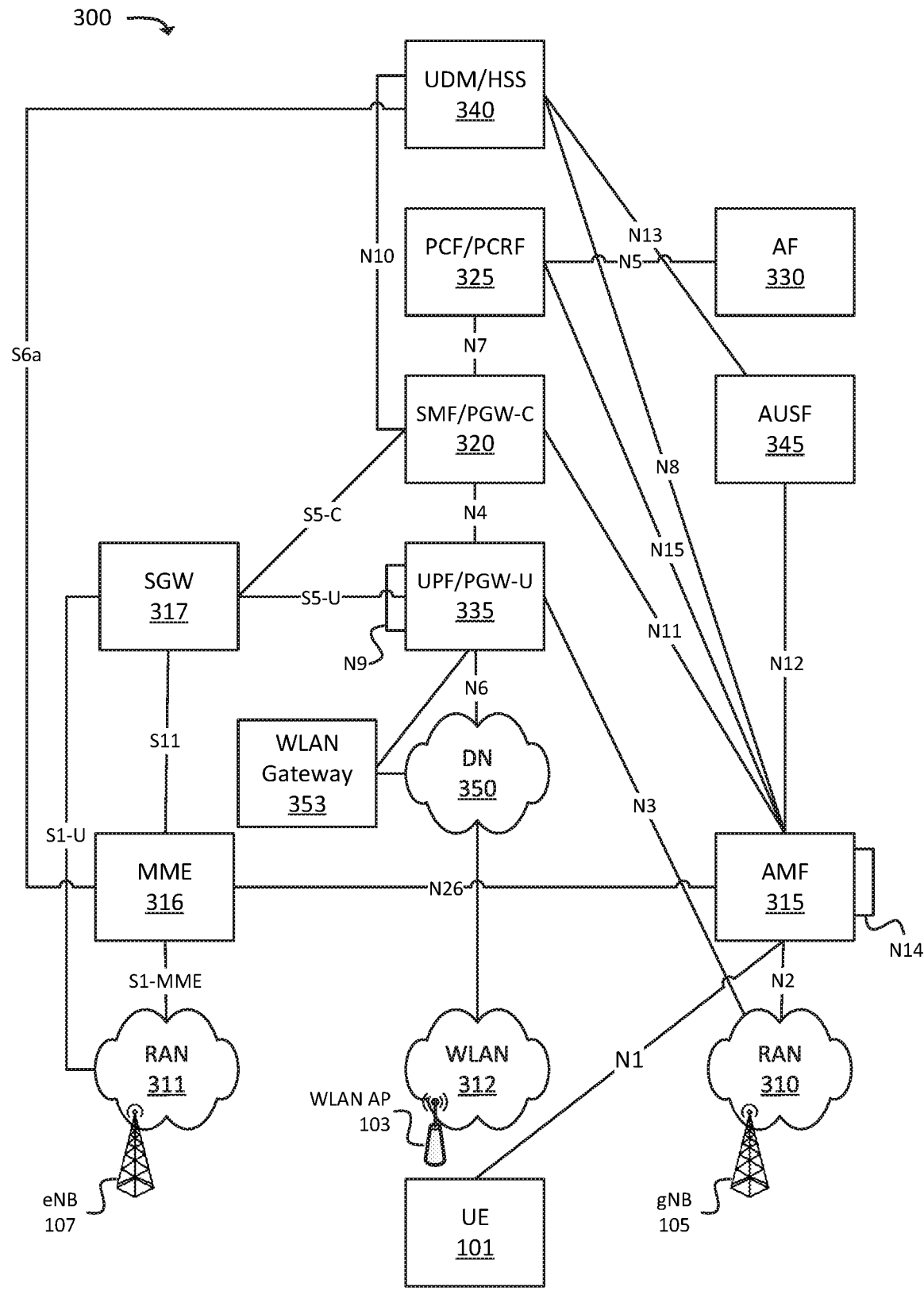
FIGS. 3 and 4 illustrate example environments in which one or more embodiments, described herein, may be implemented.

FIG. 3 illustrates an example environment 300, in which one or more embodiments may be implemented. In some embodiments, environment 300 may correspond to a 5G network, and/or may include elements of a 5G network. In some embodiments, environment 300 may correspond to a 5G Non-Standalone ("NSA") architecture, in which a 5G RAT may be used in conjunction with one or more other RATs (e.g., a LTE RAT), and/or in which elements of a 5G core network may be implemented by, may be communicatively coupled with, and/or may include elements of another type of core network (e.g., an evolved packet core ("EPC")). In some embodiments, FIG. 3 represents elements of a 5G core and a LTE core, such as elements that correspond to environments in which a 5G SA architecture may be implemented. For example, as discussed below with respect to FIG. 4, discrete 5G and LTE core networks may be implemented, and multiple instances of some or all of the devices or systems shown in FIG. 3 may be deployed in these discrete 5G and LTE core networks.

As shown in FIG. 3, environment 300 may include UE 101, RAN 310 (which may include one or more Next Generation Node Bs ("gNBs") 105), RAN 311 (which may include one or more one or more evolved Node Bs ("eNBs") 107), WLAN 312 (which may include WLAN AP 103), and various network functions such as Access and Mobility Management Function ("AMF") 315, Mobility Management Entity ("MME") 316, Serving Gateway ("SGW") 317, Session Management Function ("SMF")/Packet Data Network ("PDN") Gateway ("PGW")-Control plane function ("PGW-C") 320, Policy Control Function ("PCF")/Policy Charging and Rules Function ("PCRF") 325, Application Function ("AF") 330, User Plane Function ("UPF")/PGW-User plane function ("PGW-U") 335, Unified Data Management ("UDM")/Home Subscriber Server ("HSS") 340, and Authentication Server Function ("AUSF") 345. Environment 300 may also include one or more networks, such as Data Network ("DN") 350.

As noted above, environment 300 may correspond to an NSA architecture, and/or may include elements that may be included in multiple core networks in a 5G SA architecture. Thus, the description of a given element may describe a device or system that implements the described functionality in a LTE core network, a 5G core network, and/or "hybrid" core network that is able to serve as both a LTE core network and a 5G core network. Thus, in the example of PCF/PCRF 325, the functionality described below with respect to PCF/ PCRF 325 may describe a PCF of a 5G core network, a PCRF of a LTE core network, and/or a device or system that serves as both or either of a PCF or a PCRF.

The quantity of devices and/or networks, illustrated in FIG. 3, is provided for explanatory purposes only. In practice, environment 300 may include additional devices and/or networks, fewer devices and/or networks, different devices and/or networks, or differently arranged devices and/or networks than illustrated in FIG. 3. For example, while not shown, environment 300 may include devices that facilitate or enable communication between various components shown in environment 300, such as routers, modems, gateways, switches, hubs, etc. Alternatively, or additionally, one or more of the devices of environment 300 may perform one or more network functions described as being performed by another one or more of the devices of environment 300. Devices of environment 300 may interconnect with each other and/or other devices via wired connections, wireless connections, or a combination of wired and wireless connections. In some implementations, one or more devices of environment 300 may be physically integrated in, and/or may be physically attached to, one or more other devices of environment 300.

UE 101 may include a computation and communication device, such as a wireless mobile communication device that is capable of communicating with RAN 310, RAN 312, and/or DN 350. UE 101 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, or the like), a wearable device, an Internet of Things ("IoT") device, a Mobile-to-Mobile ("M2M") device, or another type of mobile computation and communication device. UE 101 may send traffic to and/or receive traffic (e.g., user plane traffic) from DN 350 via RAN 310, RAN 312, and/or UPF/PGW-U 335.

RAN 310 may be, or may include, a 5G RAN that includes one or more base stations (e.g., one or more gNBs 105), via which UE 101 may communicate with one or more other elements of environment 300. UE 101 may communicate with RAN 310 via an air interface (e.g., as provided by gNB 105). For instance, RAN 310 may receive traffic (e.g., voice call traffic, data traffic, messaging traffic, signaling traffic, etc.) from UE 101 via the air interface, and may communicate the traffic to UPF/PGW-U 335, and/or one or more other devices or networks. Similarly, RAN 310 may receive traffic intended for UE 101 (e.g., from UPF/PGW-U 335, AMF 315, and/or one or more other devices or networks) and may communicate the traffic to UE 101 via the air interface.

RAN 311 may be, or may include, an LTE RAN that includes one or more base stations (e.g., one or more eNBs 107), via which UE 101 may communicate with one or more other elements of environment 300. UE 101 may communicate with RAN 311 via an air interface (e.g., as provided by eNB 107). For instance, RAN 310 may receive traffic (e.g., voice call traffic, data traffic, messaging traffic, signaling traffic, etc.) from UE 101 via the air interface, and may communicate the traffic to UPF/PGW-U 335, and/or one or more other devices or networks. Similarly, RAN 310 may receive traffic intended for UE 101 (e.g., from UPF/PGW-U 335, SGW 317, and/or one or more other devices or networks) and may communicate the traffic to UE 101 via the air interface.

WLAN 312 may be, or may include, an unlicensed RAN (e.g., a RAN that implements a WiFi RAT or some other unlicensed RAT), via which UE 101 may communicate with one or more other elements of environment 300. UE 101 may communicate with WLAN 312 via an air interface (e.g., as provided by WLAN AP 103). For example, WLAN 312 may receive traffic (e.g., voice call traffic, data traffic, messaging traffic, signaling traffic, etc.) from UE 101 via the air interface, and may communicate the traffic to UPF/PGW-U 335, and/or one or more other devices or networks (e.g., via WLAN gateway 353). Similarly, RAN 310 may receive traffic intended for UE 101 (e.g., from UPF/PGW-U 335, SGW 317, WLAN gateway 353, and/or one or more other devices or networks) and may communicate the traffic to UE 101 via the air interface.

AMF 315 may include one or more devices, systems, Virtualized Network Functions ("VNFs"), etc., that perform operations to register UE 101 with the 5G network, to establish bearer channels associated with a session with UE 101, to hand off UE 101 from the 5G network to another network, to hand off UE 101 from the other network to the 5G network, manage mobility of UE 101 between RANs 310 and/or gNBs 105, and/or to perform other operations. In some embodiments, the 5G network may include multiple AMFs 315, which communicate with each other via the N14 interface (denoted in FIG. 3 by the line marked "N14" originating and terminating at AMF 315).

MME 316 may include one or more devices, systems, VNFs, etc., that perform operations to register UE 101 with the EPC, to establish bearer channels associated with a session with UE 101, to hand off UE 101 from the EPC to another network, to hand off UE 101 from another network to the EPC, manage mobility of UE 101 between RANs 311 and/or eNBs 107, and/or to perform other operations.

SGW 317 may include one or more devices, systems, VNFs, etc., that aggregate traffic received from one or more eNBs 107 and send the aggregated traffic to an external network or device via UPF/PGW-U 335. Additionally, SGW 317 may aggregate traffic received from one or more UPF/PGW-Us 335 and may send the aggregated traffic to one or more eNBs 107. SGW 317 may operate as an anchor for the user plane during inter-eNB handovers and as an anchor for mobility between different telecommunication networks or RANs (e.g., RANs 310 and 311).

SMF/PGW-C 320 may include one or more devices, systems, VNFs, etc., that gather, process, store, and/or provide information in a manner described herein. SMF/PGW-C 320 may, for example, facilitate in the establishment of communication sessions on behalf of UE 101. In some embodiments, the establishment of communications sessions may be performed in accordance with one or more policies provided by PCF/PCRF 325.

PCF/PCRF 325 may include one or more devices, systems, VNFs, etc., that aggregate information to and from the 5G network and/or other sources. PCF/PCRF 325 may receive information regarding policies and/or subscriptions from one or more sources, such as subscriber databases and/or from one or more users (such as, for example, an administrator associated with PCF/PCRF 325).

AF 330 may include one or more devices, systems, VNFs, etc., that receive, store, and/or provide information that may be used in determining parameters (e.g., quality of service parameters, charging parameters, or the like) for certain applications.

UPF/PGW-U 335 may include one or more devices, systems, VNFs, etc., that receive, store, and/or provide data (e.g., user plane data). For example, UPF/PGW-U 335 may receive user plane data (e.g., voice call traffic, data traffic, etc.), destined for UE 101, from DN 350, and may forward the user plane data toward UE 101 (e.g., via RAN 310, SMF/PGW-C 320, and/or one or more other devices). In some embodiments, multiple UPFs 335 may be deployed (e.g., in different geographical locations), and the delivery of content to UE 101 may be coordinated via the N9 interface (e.g., as denoted in FIG. 3 by the line marked "N9" originating and terminating at UPF/PGW-U 335). Similarly, UPF/PGW-U 335 may receive traffic from UE 101 (e.g., via RAN 310, SMF/PGW-C 320, and/or one or more other devices), and may forward the traffic toward DN 350. In some embodiments, UPF/PGW-U 335 may communicate (e.g., via the N4 interface) with SMF/PGW-C 320, regarding user plane data processed by UPF/PGW-U 335.

UDM/HSS 340 and AUSF 345 may include one or more devices, systems, VNFs, etc., that manage, update, and/or store, in one or more memory devices associated with AUSF 345 and/or UDM/HSS 340, profile information associated with a subscriber. AUSF 345 and/or UDM/HSS 340 may perform authentication, authorization, and/or accounting operations associated with the subscriber and/or a communication session with UE 101.

DN 350 may include one or more wired and/or wireless networks. For example, DN 350 may include an Internet Protocol ("IP")-based PDN, a wide area network ("WAN") such as the Internet, a private enterprise network, and/or one or more other networks. UE 101 may communicate, through DN 350, with data servers, other UEs 101, and/or to other servers or applications that are coupled to DN 350. DN 350 may be connected to one or more other networks, such as a public switched telephone network ("PSTN"), a public land mobile network ("PLMN"), and/or another network. DN 350 may be connected to one or more devices, such as content providers, applications, web servers, and/or other devices, with which UE 101 may communicate.

WLAN gateway 353 may include one or more devices, systems, VNFs, etc. that serve as an interface between WLAN AP 103 and UPF/PGW-U 335. For example, WLAN gateway 353 may receive traffic from WLAN 312 (e.g., via DN 350), and may forward the traffic to UPF/PGW-U 335. Similarly, WLAN gateway 353 may receive traffic from UPF/PGW-U 335, destined for UE 101, and may forward the traffic to UE 101 via DN 350, WLAN 312, and/or WLAN AP 103. In some embodiments, WLAN gateway 353 may be, or may include, an ePDG and/or some other suitable device or system.

Figure 4:
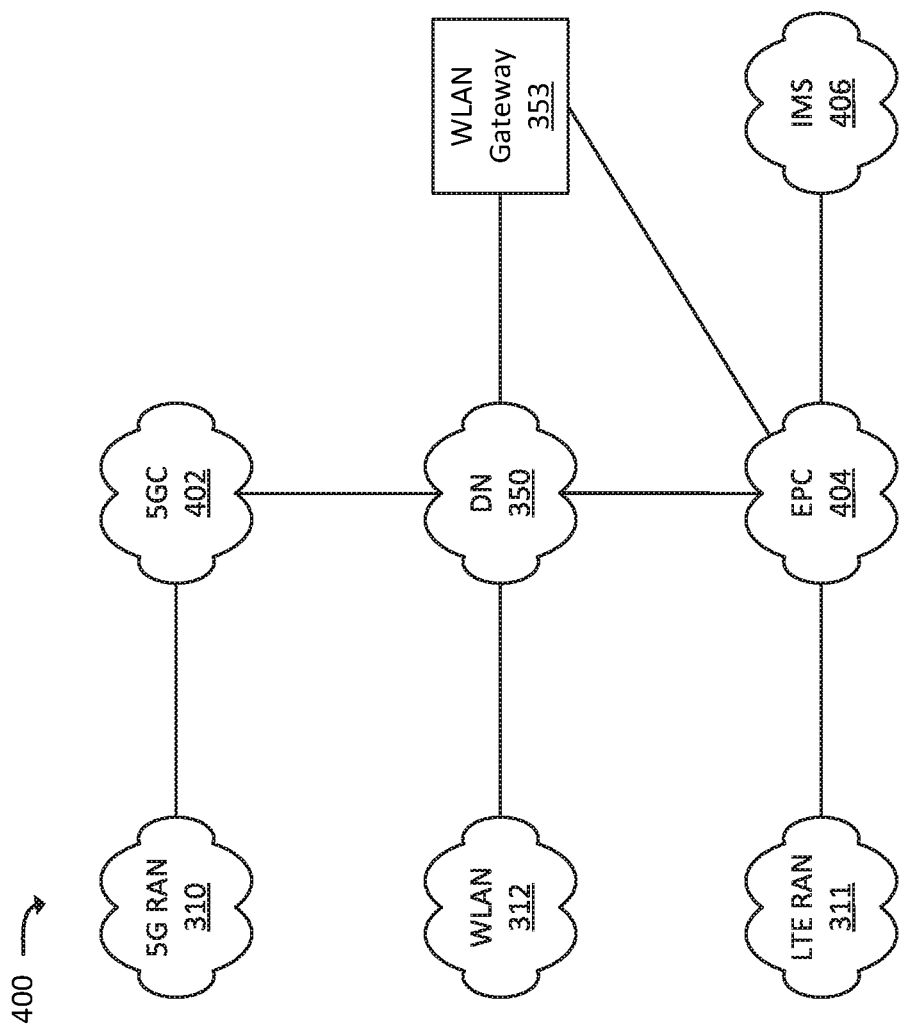

FIG. 4 illustrates an example environment 400, in which one or more embodiments may be implemented. In some embodiments, the illustration of environment 400 provided in FIG. 4 may be an alternate representation of one or more elements or networks depicted in FIG. 3. For example, as noted above with respect to FIG. 3, one or more of the elements shown in FIG. 3 may correspond to a 5G SA architecture. As shown in FIG. 4, 5G RAN 310 may be communicatively coupled to 5GC 402, and LTE RAN 311 may be communicatively coupled to EPC 404. For example, 5GC 402 may include one or more instances of SMF 320, PCF 325, AF 330, UPF 335, UDM 340, etc. Similarly, EPC 404 may include one or more instances of SGW 317, PGW-C 320, PCRF 325, PGW-U 335, HSS 340, etc.

Further, WLAN 312 may be communicatively coupled to one or more elements of EPC 404 via DN 350 (e.g., the Internet) and WLAN gateway 353 (e.g., an ePDG). As further shown, EPC 404 may be communicatively coupled to IMS network 406, which may provide voice services (e.g., call setup or other control signaling) for VoLTE and/or VoWiFi calls.

Figure 5:
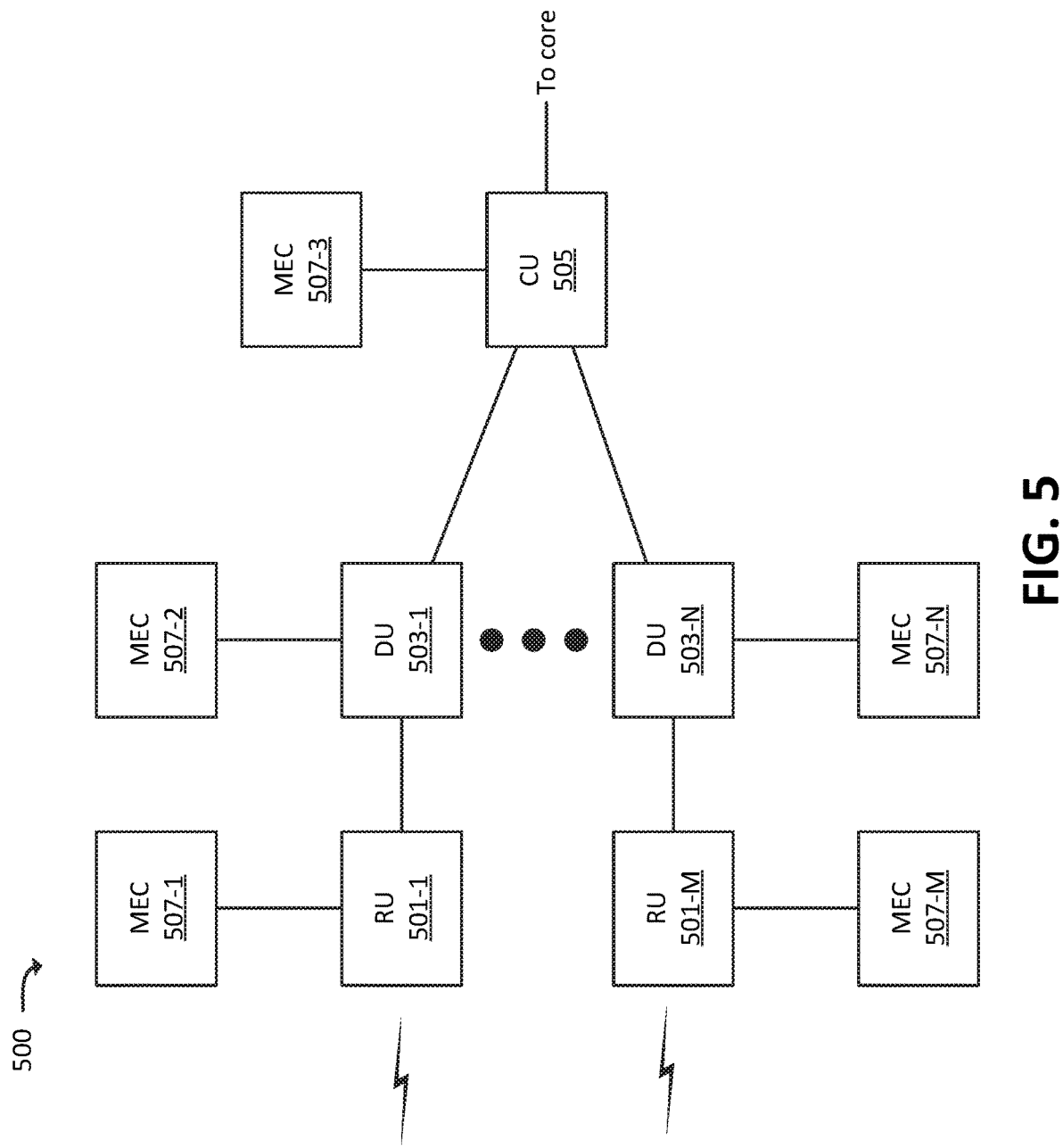
FIG. 5 illustrates an example arrangement of a radio access network ("RAN"), in accordance with some embodiments.

FIG. 5 illustrates an example Distributed Unit ("DU") network 500, which may be included in and/or implemented by one or more RANs (e.g., RAN 310). In some embodiments, a particular RAN may include one DU network 500. In some embodiments, a particular RAN may include multiple DU networks 500. In some embodiments, DU network 500 may correspond to a particular gNB 105 of a 5G RAN (e.g., RAN 310). In some embodiments, DU network 500 may correspond to multiple gNBs 105. In some embodiments, DU network 500 may correspond to one or more other types of base stations of one or more other types of RANs. As shown, DU network 500 may include Central Unit ("CU") 505, one or more Distributed Units ("DUs") 503-1 through 503-N (referred to individually as "DU 503," or collectively as "DUs 503"), and one or more Remote Units ("RUs") 501-1 through 501-M (referred to individually as "RU 501," or collectively as "RUs 501").

CU 505 may communicate with a core of a wireless network (e.g., may communicate with one or more of the devices or systems described above with respect to FIG. 3, such as AMF 315 and/or UPF/PGW-U 335). In the uplink direction (e.g., for traffic from UEs 101 to a core network), CU 505 may aggregate traffic from DUs 503, and forward the aggregated traffic to the core network. In some embodiments, CU 505 may receive traffic according to a given protocol (e.g., Radio Link Control ("RLC")) from DUs 503, and may perform higher-layer processing (e.g., may aggregate/process RLC packets and generate Packet Data Convergence Protocol ("PDCP") packets based on the RLC packets) on the traffic received from DUs 503.

In accordance with some embodiments, CU 505 may receive downlink traffic (e.g., traffic from the core network) for a particular UE 101, and may determine which DU(s) 503 should receive the downlink traffic. DU 503 may include one or more devices that transmit traffic between a core network (e.g., via CU 505) and UE 101 (e.g., via a respective RU 501). DU 503 may, for example, receive traffic from RU 501 at a first layer (e.g., physical ("PHY") layer traffic, or lower PHY layer traffic), and may process/aggregate the traffic to a second layer (e.g., upper PHY and/or RLC). DU 503 may receive traffic from CU 505 at the second layer, may process the traffic to the first layer, and provide the processed traffic to a respective RU 501 for transmission to UE 101.

RU 501 may include hardware circuitry (e.g., one or more RF transceivers, antennas, radios, and/or other suitable hardware) to communicate wirelessly (e.g., via an RF interface) with one or more UEs 101, one or more other DUs 503 (e.g., via RUs 501 associated with DUs 503), and/or any other suitable type of device. In the uplink direction, RU 501 may receive traffic from UE 101 and/or another DU 503 via the RF interface and may provide the traffic to DU 503. In the downlink direction, RU 501 may receive traffic from DU 503, and may provide the traffic to UE 101 and/or another DU 503.

RUs 501 may, in some embodiments, be communicatively coupled to one or more Multi-Access/Mobile Edge Computing ("MEC") devices, referred to sometimes herein simply as ("MECs") 507. For example, RU 501-1 may be communicatively coupled to MEC 507-1, RU 501-M may be communicatively coupled to MEC 507-M, DU 503-1 may be communicatively coupled to MEC 507-2, DU 503-N may be communicatively coupled to MEC 507-N, CU 505 may be communicatively coupled to MEC 507-3, and so on. MECs 507 may include hardware resources (e.g., configurable or provisionable hardware resources) that may be configured to provide services and/or otherwise process traffic to and/or from UE 101, via a respective RU 501.

For example, RU 501-1 may route some traffic, from UE 101, to MEC 507-1 instead of to a core network (e.g., via DU 503 and CU 505). MEC 507-1 may process the traffic, perform one or more computations based on the received traffic, and may provide traffic to UE 101 via RU 501-1. In this manner, ultra-low latency services may be provided to UE 101, as traffic does not need to traverse DU 503, CU 505, and an intervening backhaul network between DU network 500 and the core network.

Figure 6:
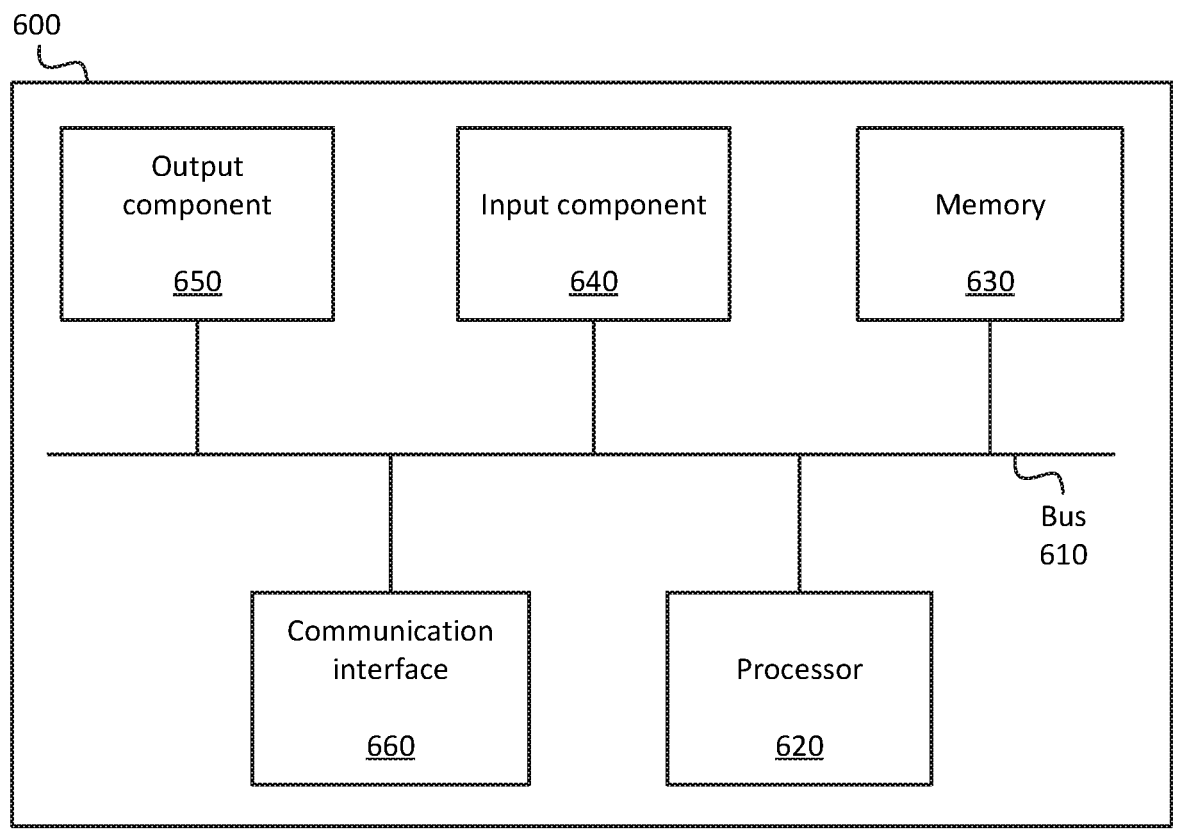
FIG. 6 illustrates example functional components of one or more devices, in accordance with one or more embodiments described herein.

FIG. 6 illustrates example components of device 600. One or more of the devices described above may include one or more devices 600. Device 600 may include bus 610, processor 620, memory 630, input component 640, output component 650, and communication interface 660. In another implementation, device 600 may include additional, fewer, different, or differently arranged components.

Bus 610 may include one or more communication paths that permit communication among the components of device 600. Processor 620 may include a processor, microprocessor, or processing logic that may interpret and execute instructions. Memory 630 may include any type of dynamic storage device that may store information and instructions for execution by processor 620, and/or any type of non-volatile storage device that may store information for use by processor 620.

Input component 640 may include a mechanism that permits an operator to input information to device 600, such as a keyboard, a keypad, a button, a switch, etc. Output component 650 may include a mechanism that outputs information to the operator, such as a display, a speaker, one or more light emitting diodes ("LEDs"), etc.

Communication interface 660 may include any transceiver-like mechanism that enables device 600 to communicate with other devices and/or systems. For example, communication interface 660 may include an Ethernet interface, an optical interface, a coaxial interface, or the like. Communication interface 660 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 600 may include more than one communication interface 660. For instance, device 600 may include an optical interface and an Ethernet interface.

Device 600 may perform certain operations relating to one or more processes described above. Device 600 may perform these operations in response to processor 620 executing software instructions stored in a computer-readable medium, such as memory 630. A computer-readable medium may be defined as a non-transitory memory device. A memory device may include space within a single physical memory device or spread across multiple physical memory devices. The software instructions may be read into memory 630 from another computer-readable medium or from another device. The software instructions stored in memory 630 may cause processor 620 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1A-1D and 2), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information provided by individuals, it should be understood that such information shall be collected, stored, and used in accordance with all applicable laws concerning protection of personal information. Additionally, the collection, storage, and use of such information may be subject to consent of the individual to such activity (for example, through "opt-in" or "opt-out" processes, as may be appropriate for the situation and type of information). Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
   one or more processors configured to:
      determine that the device is engaged in an active communication session via an access point that implements an unlicensed radio access technology ("RAT");
      determine that the device is connected to a first base station, that implements a first licensed RAT, while the device is engaged in the active communication session via the unlicensed RAT;
      connect to a second base station that implements a different second licensed RAT based on determining that the device is engaged in the active communication session via the unlicensed RAT and further based on determining that the device is connected to the first base station that implements the first licensed RAT;
      initiate a handover of the active communication session from the access point, that implements the unlicensed RAT, to the second base station that implements the second licensed RAT, wherein initiating the handover causes the active communication session to be carried via the second base station in lieu of by the access point;
      determine, after the active communication session has been handed over to the second base station, that the active communication session has ended; and
      based on determining that the active communication session has ended, connect to the first base station.

2. The device of claim 1, wherein the one or more processors are further configured to:
   determine, while engaged in the active communication session via the access point, that a signal quality between the device and the access point is below a threshold,
   wherein the handover of the active communication session over from the access point to the second base station is initiated based on determining that the signal quality between the device and the access point is below the threshold.

3. The device of claim 1, wherein the first RAT is a Fifth Generation ("5G") RAT, and wherein the second RAT is a RAT other than a 5G RAT.

4. The device of claim 1, wherein the second RAT is a Long-Term Evolution ("LTE") RAT.

5. The device of claim 1, wherein the one or more processors are further configured to:
   release, after connecting to the second base station, a context associated with the first base station and the device.

6. The device of claim 1, wherein the active communication session includes a voice call, wherein carrying the handed over active communication session via the second base station includes carrying a Voice over LTE ("VoLTE") call, associated with the device, via the second base station.

7. The device of claim 1, wherein the one or more processors are further configured to:
   based on determining that the active communication session has ended, perform a scan for a base station that implements the first licensed RAT; and detect the first base station based on performing the scan, wherein connecting to the first base station is further based on detecting the first base station.

8. A non-transitory computer-readable medium, storing a plurality of processor-executable instructions to:
determine that a device is engaged in an active communication session via an access point that implements an unlicensed radio access technology ("RAT");
determine that the device is connected to a first base station, that implements a first licensed RAT, while the device is engaged in the active communication session via the unlicensed RAT;
cause the device to connect to a second base station that implements a different second licensed RAT based on determining that the device is engaged in the active communication session via the unlicensed RAT and further based on determining that the device is connected to the first base station that implements the first licensed RAT;
cause the device to initiate a handover of the active communication session from the access point, that implements the unlicensed RAT, to the second base station that implements the second licensed RAT, wherein initiating the handover causes the active communication session to be carried via the second base station in lieu of by the access point;
determine, after the active communication session has been handed over to the second base station, that the active communication session has ended; and
based on determining that the active communication session has ended, connect to the first base station.

9. The non-transitory computer-readable medium of claim 8, wherein the plurality of processor-executable instructions further include processor-executable instructions to:
determine, while engaged in the active communication session via the access point, that a signal quality between the device and the access point is below a threshold,
wherein the handover of the active communication session over from the access point to the second base station is initiated based on determining that the signal quality between the device and the access point is below the threshold.

10. The non-transitory computer-readable medium of claim 8, wherein the first RAT is a Fifth Generation ("5G") RAT, and wherein the second RAT is a RAT other than a 5G RAT.

11. The non-transitory computer-readable medium of claim 8, wherein the second RAT is a Long-Term Evolution ("LTE") RAT.

12. The non-transitory computer-readable medium of claim 8, wherein the plurality of processor-executable instructions further include processor-executable instructions to:
cause the device to release, after connecting to the second base station, a context associated with the first base station and the device.

13. The non-transitory computer-readable medium of claim 8, wherein the active communication session includes a voice call, wherein carrying the handed over active communication session via the second base station includes carrying a Voice over LTE ("VoLTE") call, associated with the device, via the second base station.

14. The non-transitory computer-readable medium of claim 8, wherein the plurality of processor-executable instructions further include processor-executable instructions to:
based on determining that the active communication session has ended, perform a scan for a base station that implements the first licensed RAT; and
detect the first base station based on performing the scan, wherein connecting to the first base station is further based on detecting the first base station.

15. A method, comprising:
determining that a device is engaged in an active communication session via an access point that implements an unlicensed radio access technology ("RAT");
determining that the device is connected to a first base station, that implements a first licensed RAT, while the device is engaged in the active communication session via the unlicensed RAT;
connecting to a second base station that implements a different second licensed RAT based on determining that the device is engaged in the active communication session via the unlicensed RAT and further based on determining that the device is connected to the first base station that implements the first licensed RAT;
initiating a handover of the active communication session from the access point, that implements the unlicensed RAT, to the second base station that implements the second licensed RAT, wherein initiating the handover causes the active communication session to be carried via the second base station in lieu of by the access point; and
determining, after the active communication session has been handed over to the second base station, that the active communication session has ended; and
based on determining that the active communication session has ended, connecting to the first base station.

16. The method of claim 15, the method further comprising:
determining, while engaged in the active communication session via the access point, that a signal quality between the device and the access point is below a threshold,
wherein the handover of the active communication session over from the access point to the second base station is initiated based on determining that the signal quality between the device and the access point is below the threshold.

17. The method of claim 15, wherein the first RAT is a Fifth Generation ("5G") RAT, and wherein the second RAT is a Long-Term Evolution ("LTE") RAT.

18. The method of claim 15, the method further comprising:
releasing, after connecting to the second base station, a context associated with the first base station and the device.

19. The method of claim 15, wherein the active communication session includes a voice call, wherein carrying the handed over active communication session via the second base station includes carrying a Voice over LTE ("VoLTE") call, associated with the device, via the second base station.

20. The method of claim 15, further comprising:
based on determining that the active communication session has ended, performing a scan for a base station that implements the first licensed RAT; and
detecting the first base station based on performing the scan, wherein connecting to the first base station is further based on detecting the first base station.

* * * * *